(12) United States Patent
Bolz (10) Patent No.: US 8,174,286 B2
(45) Date of Patent: May 8, 2012

(54) TRANSCEIVER CIRCUITS

(75) Inventor: Stephan Bolz, Pfatter (DE)

(73) Assignee: Continental Automotive GmbH, Hannover (DE)

( * ) Notice: Subject to any disclaimer, the term of this patent is extended or adjusted under 35 U.S.C. 154(b) by 173 days.

(21) Appl. No.: 12/674,311

(22) PCT Filed: Aug. 19, 2008

(86) PCT No.: PCT/EP2008/060819
§ 371 (c)(1), (2), (4) Date: Feb. 19, 2010

(87) PCT Pub. No.: WO2009/024564
PCT Pub. Date: Feb. 26, 2009

(65) Prior Publication Data
US 2011/0187405 A1    Aug. 4, 2011

(30) Foreign Application Priority Data
Aug. 22, 2007 (DE) .......................... 10 2007 039 616

(51) Int. Cl.
*H03K 19/003* (2006.01)

(52) U.S. Cl. .......................................... 326/30; 326/83
(58) Field of Classification Search .................. None
See application file for complete search history.

(56) References Cited

U.S. PATENT DOCUMENTS

| 5,731,711 | A | * | 3/1998 | Gabara | 326/30 |
| 5,781,028 | A | | 7/1998 | Decuir | |
| 6,051,989 | A | * | 4/2000 | Walck | 326/30 |
| 6,172,576 | B1 | * | 1/2001 | Endo et al. | 331/116 R |
| 6,351,138 | B1 | * | 2/2002 | Wong | 326/30 |
| 6,636,069 | B1 | * | 10/2003 | Muljono | 326/30 |
| 6,924,660 | B2 | | 8/2005 | Nguyen et al. | |
| 7,262,630 | B1 | | 8/2007 | Andrews et al. | |
| 2007/0139071 | A1 | | 6/2007 | Nguyen | |
| 2008/0031166 | A1 | | 2/2008 | Fukuda | |

FOREIGN PATENT DOCUMENTS
EP    1050824 A2    11/2000
EP    1410589 B1    4/2005

OTHER PUBLICATIONS

Tyhach et al.: "A 90-nm FPGA I/O Buffer Design with 1.6-Gb/s Data Rate for Source-Synchroinous System and 300-MHz Clock Rate for External Memory Interface", IEEE Journal of Solid-State Circuits, vol. 40, No. 9, Sep. 2005, pp. 1829-1838, XP011138478, Piscataway, US.

* cited by examiner

*Primary Examiner* — Shawki S Ismail
*Assistant Examiner* — Crystal L Hammond
(74) *Attorney, Agent, or Firm* — Laurence A. Greenberg; Werner H. Stemer; Ralph E. Locher (57) ABSTRACT

A transceiver circuit supports a bidirectional mode and the bidirectional transceiver circuit is signal-compatible with JEDEC SSTL 2. A differential transceiver circuit supports a bidirectional mode and is also signal-compatible with JEDEC SSTL 2. Finally, transceiver circuits which, in interaction with the bidirectional transceiver circuits, allow a bus system to be set up.

29 Claims, 6 Drawing Sheets

TRANSCEIVER CIRCUITS

BACKGROUND OF THE INVENTION

Field of the Invention

The present invention relates to a transceiver circuit which supports a bidirectional mode. The present invention relates in particular to a bidirectional transceiver circuit which is signal-compatible with JEDEC SSTL 2. The present invention also relates to a differential transceiver circuit which supports a bidirectional mode and is signal-compatible with JEDEC SSTL 2. Finally, the present invention relates to transceiver circuits which, in interaction with the bidirectional transceiver circuits, allow a bus system to be set up.

In addition to the system clock, the performance of modern microcontroller and microprocessor systems is to a very large extent determined by the time taken by the arithmetic logic unit to access stored data. Therefore a section of the program and data memory is usually integrated together with the arithmetic logic unit on one chip (frequently termed a cache). Chip area and manufacturing costs are limiting factors for the size of this memory. The overall costs of the integrated functions are certainly reduced by increased integration, but of course the chip area also usually increases with integration, and with the chip area the reject rate also increases during chip production, which in turn results in lower profitability of the manufacturing process. Therefore in practice the size chosen for the program and data memory, integrated together with the arithmetic logic unit on one chip, is a reasonable compromise between economic aspects and technical requirements.

As a rule, the size of this memory does not correspond to the total memory requirement for a given microcontroller or microprocessor system. It follows from this that a part of the memory must be provided as an external memory outside the controller/processor chip.

Electrical signal lines which are usually routed via a substrate, for example a printed circuit board, are required for the communication between arithmetic logic unit and external memory. At the same time, the data transmission rate on the signal lines is limited by the propagation rate of electrical waves. The following holds good for the propagation rate v:

$$v = c/\sqrt{\epsilon_r}$$

A propagation rate v=20 cm/ns is given for the conventional printed circuit board material FR4. In this material a signal with a frequency of 1 GHz has a wavelength λ=20 cm, which follows from the relationship λ=f·v.

In the case of simple lines without impedance matching, if the frequency components contained in the data signals are in a corresponding ratio to the length of the communication lines, this can result in signal distortion due to line reflections. Typically, this ratio is 1:8 for a line length l and a wavelength λ of the frequency f under consideration.

$$l/\lambda < 1/8$$

Here there is a relationship between the rise time and fall time $t_{r,f}$ of a digital signal and an assignable frequency.

$$t_{r,f} \sim 1/f$$

Since modern digital CMOS circuits definitely have switching times $t_{r,f}$ of 1 ns and below, this gives the following:

$$l/\lambda < 1/8$$

$$l < \lambda/8$$

where λ=20 cm: l<2.5 cm

Consequently, communication lines up to approximately 2.5 cm can still be laid as simple electrical connections, for example in the layout of a printed circuit board. On the other hand, if the line length exceeds approximately 2.5 cm, then line matching is necessary to prevent signal distortion due to reflections.

Here line matching means that the source impedance and/or the terminating impedance corresponds to the line impedance. In the environment under consideration the inductive and capacitive components of said impedances can be disregarded compared to the resistive component, so that (an approximate) matching can be achieved by making the source resistance $R_q$ and/or the terminating resistance $R_a$ the same as the line resistance $R_l$. In this case a distinction is to be made among three significant technical configurations:

1. $R_q = R_l$, $R_a \neq R_l$
2. $R_q \neq R_l$, $R_a = R_l$
3. $R_q = R_a = R_l$ whose characteristics can be briefly examined in the following with reference to FIG. 1. A simplified transmission path 100 containing a signal source 110, a signal line 120 and a signal sink 130 is shown schematically in FIG. 1. Here the signal source contains the source resistance $R_q$, the signal sink contains the terminating resistance $R_a$ and the signal line contains the line resistance $R_l$.

1. $R_q = R_l$, $R_a \neq R_l$

Figure 1:
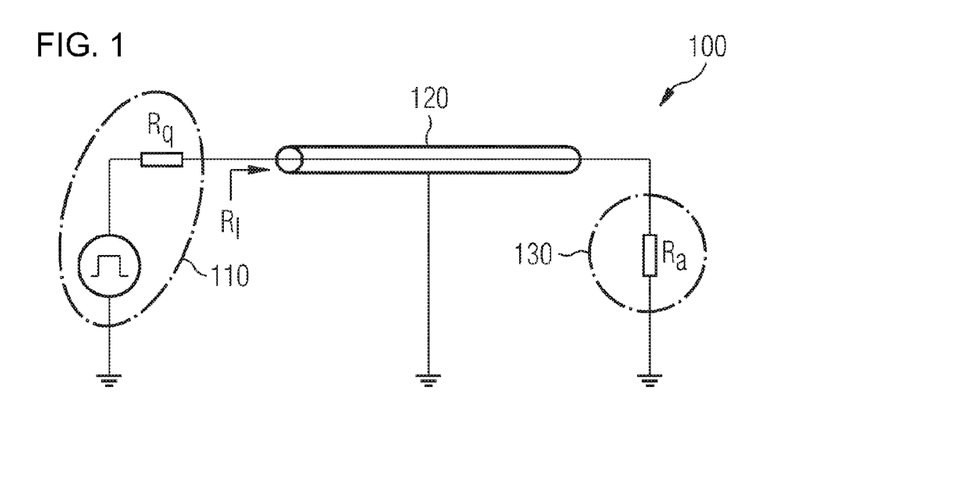
FIG. 1 shows a schematic representation of a simplified transmission path.

The source resistance $R_q$ corresponds to the line resistance $R_l$. In practice, the terminating resistance $R_a$ in this configuration is made to be infinity ($R_a \to \infty$). A rising signal edge at the signal source 110 is halved at the voltage divider $R_q$, $R_l$ and passes through the signal line 120 at the propagation rate. Depending on the value of $R_a$, a portion of the energy is reflected at the signal sink 130 and passed back to the signal source 110, where it is absorbed at the source resistance $R_q$. An edge divided into two can be observed along the line 120, which makes digital signal evaluation extremely difficult.

This configuration is suitable only for unidirectional data transmission from a signal source (gate output with series resistance for example) to a high-resistance signal sink (gate input for example). Because of the signal distortion it is not practical to connect further gate inputs along the signal line 120.

2. $R_q \neq R_l$, $R_a = R_l$

The terminating resistance $R_a$ corresponds to the line resistance $R_l$. In this configuration the source resistance $R_q$ is designed so as to tend towards zero, for example. A rising signal edge at the signal source 110 is injected into the signal line 120 at full amplitude and passes through the signal line 120 at the propagation rate. The energy at the signal sink 130 is absorbed in $R_a$, so that no energy passes back to the signal source 110. An edge with the amplitude of the source signal can be observed along the line 120, which favors digital signal evaluation.

This configuration is suitable for unidirectional data transmission from a signal source (gate output for example) to a matched signal sink (gate input with terminating resistance for example). No signal distortion occurs, and it is therefore possible to connect further high-resistance signal sinks (gate inputs without terminating resistance for example) along the signal line 120.

3. $R_q = R_a = R_l$

Both the source resistance $R_q$ and the terminating resistance $R_a$ correspond to the line resistance $R_l$. A rising signal edge at the signal source 110 is halved at the voltage divider $R_q$, $R_l$ and passes through the signal line 120 at the propagation rate. The energy is absorbed in $R_a$ at the signal sink 130, so that no energy passes back to the signal source 110. If, due to a slight mismatch, a portion of the energy should pass back, this part of the energy is then absorbed at the source resistance $R_q$. An edge having half the amplitude of the source signal can be observed along the line 120, which favors digital signal evaluation.

This configuration is especially suitable for bidirectional data transmission from a data source (gate output with series resistance for example) to a matched sink (gate input with terminating resistance for example), since, due to the symmetrical characteristics of this configuration, source and sink can easily be interchanged. Furthermore, no signal distortion occurs and it is therefore possible to connect further high-resistance signal sinks along the signal line 120.

A feature of this configuration is that only half the voltage of the signal generated by the source appears at the input of the sink. In a microcontroller system with the usual operating voltage of 2.5 V, the signal deviation is therefore 1.25 V. A receiver with defined detection thresholds for the HIGH and LOW states is therefore usually required for reliable detection of the transmitted data.

A 2.5 V bus system is described in the JEDEC Standard JESD8-9A which was published in December 2000, and relates to the "Stub Series Terminated Logic for 2.5 V (SSTL 2)". FIG. 5 of this standard in particular shows a realization of the third configuration mentioned above, where $R_q=R_a=R_t$ applies. The same operating principle is also to be found in FIGS. 4, 9, 12 and 13a, in which so-called differential instances are illustrated in FIGS. 12 and 13a.

A particular disadvantage of the circuits described in JESD8-9A is that a terminating voltage $V_{TT}$ is required which corresponds to half the operating voltage $V_{DDQ}$, which must also be available at relatively low resistance since it is loaded by the signal current $I_S=V_{TT}/(R_S+R_T)$; see FIG. 4 in JESD8-9A, for example. Furthermore, it is disadvantageous that only point-to-point links are provided for in JESD8-9A. No provision is made for coupling further transmitters or receivers along the line. Finally, bidirectional data transfer is not provided for and is also not possible.

BRIEF SUMMARY OF THE INVENTION

The object of the invention is therefore to specify a transceiver circuit which supports a bidirectional mode and is signal-compatible with JEDEC SSTL 2.

A further object of the invention is to specify a differential transceiver circuit which supports a bidirectional mode and is signal-compatible with JEDEC SSTL 2.

Furthermore, an object of the invention is to specify transceiver circuits with which a bus which is signal-compatible with JEDEC SSTL 2 can be set up.

In accordance with these objects, an inventive transceiver circuit contains the following:
  a first connection for injecting a send/receive selection signal;
  a second connection for injecting a data signal to be transmitted;
  a third connection for outputting a data signal;
  a fourth connection for a data transmission line; and
  circuit means which:
    in response to a receive signal at the first connection make available at the fourth connection, a voltage which corresponds to approximately half the operating voltage, it being possible for the terminating resistance that is effective at the fourth connection to correspond approximately to the resistance of the data transmission line in order to achieve line matching at the receiver end, and it being possible for a signal received via the data transmission line to be evaluated and output at the third connection; and
    in response to a transmit signal at the first connection make available at the fourth connection a voltage which corresponds approximately to the operating voltage, if a HIGH signal is injected at the second connection and a voltage which corresponds approximately to the ground potential is made available at the fourth connection, if a LOW signal is injected at the second connection, it being possible in both cases for the effective source resistance to correspond approximately to the resistance of the data transmission line, in order to achieve line matching at the transmitter end.

An advantage of this transceiver circuit is firstly that both transmission and reception is possible with one circuit and consequently bidirectional data transmission lines can be set up, which through choice of a suitable operating voltage can be operated so as to be signal-compatible with JEDEC SSTL 2. However, circuits are known from JEDEC SSTL 2, which are suitable for the unidirectional mode.

A further advantages is that the inventive circuit is not reliant on a terminating voltage $V_{TT}$. This voltage which is provided for in JEDEC SSTL 2 is therefore not required for the present circuit.

The invention also relates to a transceiver circuit which can be connected to an existing bidirectional data transmission line and thus allows a bus mode that is signal-compatible with JEDEC SSTL 2. A bus mode is not provided for in JEDEC SSTL 2 and is only possible with the use of this aspect of the invention. A transceiver circuit having this aspect of the invention contains the following:
  a first connection for injecting a transmit/receive selection signal;
  a second connection for injecting a data signal to be transmitted;
  a third connection for outputting a data signal;
  a fourth connection for a data transmission line; and
  circuit means, which:
    in response to a receive signal at the first connection establish a high-resistance state at the fourth connection and evaluate a signal received via the data transmission line, and output said signal at the third connection; and
    in response to a transmit signal at the first connection make available at the fourth connection a voltage which corresponds approximately to the operating voltage, if a HIGH signal is injected at the second connection and make available at the fourth connection a voltage which corresponds approximately to the ground potential, if a LOW signal is injected at the second connection, it being possible in both cases for the value of the effective source resistance to correspond approximately to the half value of the resistance of the data transmission line, in order to achieve line matching at the transmitter end.

A further aspect of the present invention relates to a transceiver circuit for driving a differential transmission path, that is to say a transmission path which has two data transmission lines, via which a data signal to be transmitted is sent simultaneously with opposite signal level and which allows reproduction of the transmitted signal at the receiver end irrespective of any deviations in the operating voltage levels or ground potentials at the transmitter and receiver ends. The common-mode range of the transmitter and receiver is the only limiting factor. A transceiver according to this aspect of the invention has the following:

a first connection for injecting a transmit/receive selection signal;

a second connection for injecting a data signal to be transmitted;

a third connection for outputting a data signal;

a fourth connection for a first data transmission line;

a fifth connection for a second data transmission line, and circuit means, which:

in response to a receive signal at the first connection, make available at the fourth connection and at the fifth connection a voltage which corresponds approximately to half the operating voltage, it being possible for the effective terminating resistance at the fourth connection to correspond approximately to the resistance of the first data transmission line, in order to achieve line matching at the receiver end, it being possible for the effective terminating resistance at the fifth connection to correspond approximately to the resistance of the second data transmission line, in order to achieve line matching at the receiver end, and it being possible for the signals received via the data transmission lines to be evaluated and to be output as a received data signal at the third connection; and in response to a transmit signal at the first connection make available at the fourth connection a voltage corresponding approximately to the operating voltage and make available at the fifth connection a voltage corresponding approximately to the ground potential, if a HIGH signal is injected at the second connection and make available at the fourth connection a voltage corresponding approximately to the ground potential and make available at the fifth connection a voltage corresponding approximately to the operating voltage, if a LOW signal is injected at the second connection, it being possible for the effective source resistance in each case to correspond approximately to the resistance of the corresponding data transmission line, in order to achieve line matching at the transmitter end.

For this transceiver circuit to drive a differential transmission path, the present invention also provides for a circuit for expansion to a bus system.

Finally the invention relates to data transmission systems with bidirectional transmission, as well as bus systems utilizing said transceiver circuits.

Preferred embodiments of the invention are specified in the subclaims.

Exemplary embodiments of the present invention are explained in more detail below with the aid of . . . figures, where.

BRIEF DESCRIPTION OF THE SEVERAL VIEWS OF THE DRAWING

DESCRIPTION OF THE INVENTION

Figure 2:
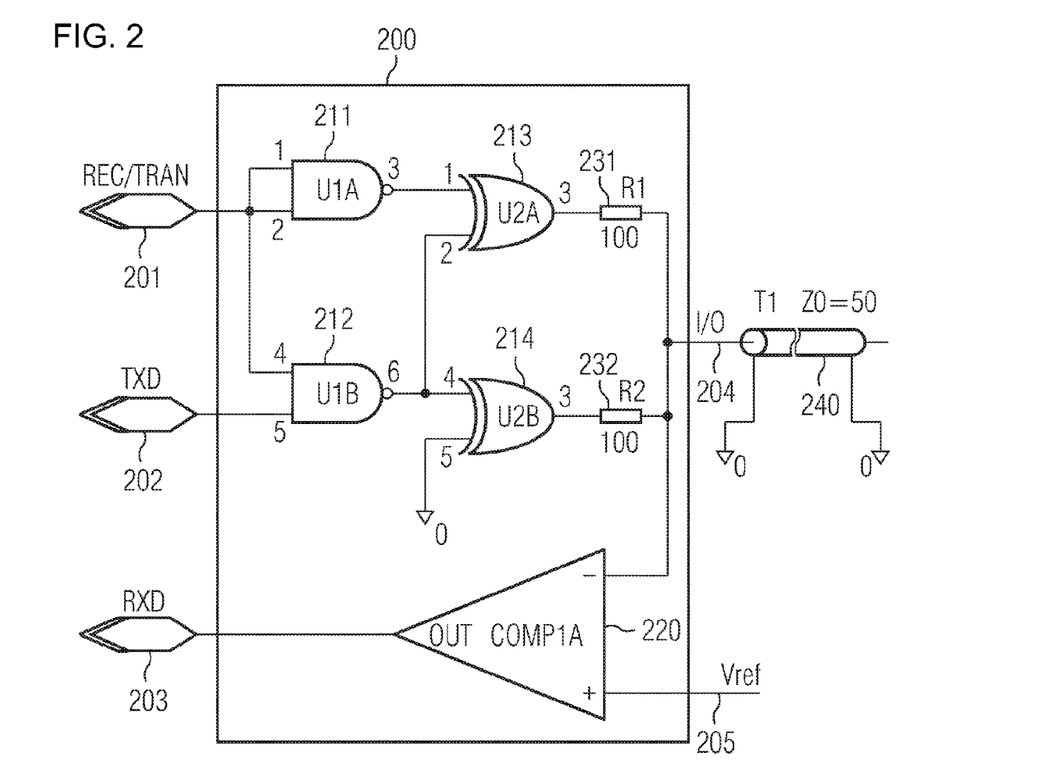
FIG. 2 shows a first transceiver circuit.

FIG. 2 shows a transceiver circuit 200 corresponding to an exemplary embodiment of the present invention, by which an interface connection can be made to a data transmission line 240 and is signal-compatible with JEDEC SSTL 2.

Transceiver 200 has five connections 201-205, namely a first connection 201 for injecting a transmit/receive selection signal, a second connection 202 for injecting a data signal to be transmitted, a third connection 203 for outputting a data signal, a fourth connection 204 for coupling the circuit 200 to the data transmission line 240 and a fifth connection 205 for injecting a reference voltage $V_{ref}$. It should be pointed out that the connection 205 for injecting the reference voltage is not necessary in every embodiment of the invention, since by means of a voltage divider, for example, the reference voltage can be easily obtained from within the circuit—from the operating voltage for example.

Transceiver 200 consists of two circuit sections, it being possible for the transmit/receive selection signal to signal at the first connection 201 whether the circuit 200 is operating in the receive mode or in the transmit mode, it being possible in the present exemplary embodiment for a LOW level at the first connection 201 to switch the circuit to the receive mode and for a HIGH level to switch the circuit to the transmit mode.

The receive section of the circuit consists of a hysteresis comparator 220, whose non-inverting input is connected to the reference voltage $V_{ref}$, it being possible in this case for the reference voltage to correspond to half the operating voltage, that is to say $V_{ref}=0.5*V_{DDQ}$. The inverting input is connected to the fourth connection 204 and consequently with the data transmission line 240. The output of the comparator 220 is connected to the connection 203 and therefore delivers the receive signal RXD. If the voltage at I/O connection 204 of the circuit 200 is greater than $V_{ref}$ plus half the hysteresis voltage, then the RXD connection 203 goes to HIGH level. If the voltage at the I/O connection 204 of the circuit 200 is less than $V_{ref}$ minus half the hysteresis voltage, then the RXD 203 goes to LOW level. Switching levels can, for example, be those provided in tables 2 and 3 of the JEDEC specification stated in the introduction.

The transmit section of the circuit 200 consists of two NAND gates 211, 212 and two XOR gates 213, 214 as well as the resistors 231, 232, via which the I/O connection 204 of the circuit and therefore the data transmission line 240 is coupled to the outputs of the XOR gates 213, 214. Since the connection between the I/O connection 204 and the receive comparator 220 is a permanent one, data which are input at the TXD connection 202 and are intended to be transmitted via the data transmission line 240, are checked at the RXD connection 203.

Receive Mode

In the receive mode a LOW signal appears at the first connection 201. This LOW-Signal appears at both inputs of the first NAND gate 211, whose output is therefore a HIGH signal, which appears at the first input 1 of the first XOR gate 213. Any other logic circuit which effects an inversion of the signal at the REC/TRAN connection 201, an inverter for example, can be provided instead of the NAND gate 211. The use of a NAND gate 211 has the advantage that the output signal is subject to the same distortion as the signal output by the second NAND gate 212, which would not always be the case with a different choice of gates 211, 212.

The LOW signal at the first connection 201 also appears at the first input 4 of the second NAND gate whose output, irrespective of the signal at the second input 5, is therefore a HIGH signal, which is delivered to the second input 2 of the first XOR gate 213 and also to the first input 4 of the second XOR gate 214.

In the receive mode the first XOR gate 213 thus receives a HIGH signal at both inputs 1 and 2 and therefore outputs a LOW signal. Here the second XOR gate 214 functions as a simple signal relay, since the second input 5 of the second XOR gate 214 is grounded and its output therefore follows the signal appearing at the first input 4 (in this case: HIGH). The advantage of using an XOR gate 214 at this position is again that the signal that is output is subject to the same distortion as the signal that is output by the first XOR gate 213; in this case too, other circuit variants which are immediately obvious to the expert are possible.

In the receive mode, outputs 3 and 6 of the XOR gates 213, 214 are therefore at different levels. Each of the outputs of the XOR gates 213, 214 is coupled to the I/O connection 204 via resistors 231, 232 respectively, which preferably have the same value, which is 100Ω in the present exemplary embodiment. Consequently, due to the voltage divider formed by the resistors R1 and R2 231, 232, a voltage corresponding to half the operating voltage appears at the I/O connection. For JEDEC SSTL 2 with an operating voltage of 2.5 V, just one voltage value of 1.25 V is produced, which corresponds to the terminating voltage $V_{TT}$, without this terminating voltage needing to be supplied separately. From the point of view of the data transmission line 240, the terminating resistance produced at the I/O connection 204 essentially corresponds to the parallel connection of the two resistors R1, R2 and in the present exemplary embodiment has a value of $R_a$=50Ω. The data transmission line 240, which in the present case has—at least approximately—a purely resistive impedance of 50Ω, is consequently matched to the sink (that is to say at the receiver end).

Transmit Mode

In the transmit mode a HIGH signal appears at the first connection 201. This HIGH signal appears at both inputs of the first NAND gate 211, whose output is therefore a LOW signal, which appears at the first input 1 of the first XOR gate 213. The HIGH-Signal at the first connection 201 also appears at the first input 4 of the second NAND gate 212, whose inverted output therefore follows the signal at the second input 5. The signal to be transmitted TXD, which is injected at the second connection 202, appears at the second input 5 of the second NAND gate 212. As explained above, the output of the second NAND gate 212 and therefore also that of the second XOR gate 214, thus follow the inverted signal to be transmitted. The same applies to the output of the first NAND gate 213 since, irrespective of signal a, TXD connection 202, a LOW signal from the first NAND gate 211 appears at the first input 1 of said XOR gate, and at the second input 2 the inverted TXD signal from the second NAND gate 212.

In the transmit mode, the outputs 3 and 6 of the XOR gates 213, 214 therefore always have identical levels. By means of the resistors R1 and R2 231, 232 a LOW level is established at the I/O connection 204 when there is a HIGH signal at the TXD-connection 202 and a HIGH level when there is a LOW signal at the TXD-connection 202. From the point of view of the data transmission line 240, the source resistance produced at the I/O connection 204 essentially corresponds to the parallel connection of the two resistors R1, R2 and has a value of $R_q$=50Ω in the present exemplary embodiment. The data transmission line 240, which in the present case—at least approximately—has a purely resistive impedance of 50Ω is therefore matched to the source (that is to say at the transmitter end).

Due to the data transmission line 240 being terminated at the other end (not shown) by a terminating resistance $R_a$=50Ω, for example by means of a circuit of identical construction which operates in the receive mode, the voltage value is, by the resulting voltage divider, divided down to permissible values in accordance with JEDEC SSTL 2 tables 4 and 5.

It should be pointed out that an additional advantage of the transceiver 200 illustrated in FIG. 2 is that each of the outputs 3 and 6 of the two XOR gates 213, 214 delivers only half the load current. This allows the output transistors of the XOR gates 213, 214 to be rated correspondingly lower, thereby enabling savings in cost and space to be achieved.

Figure 3:
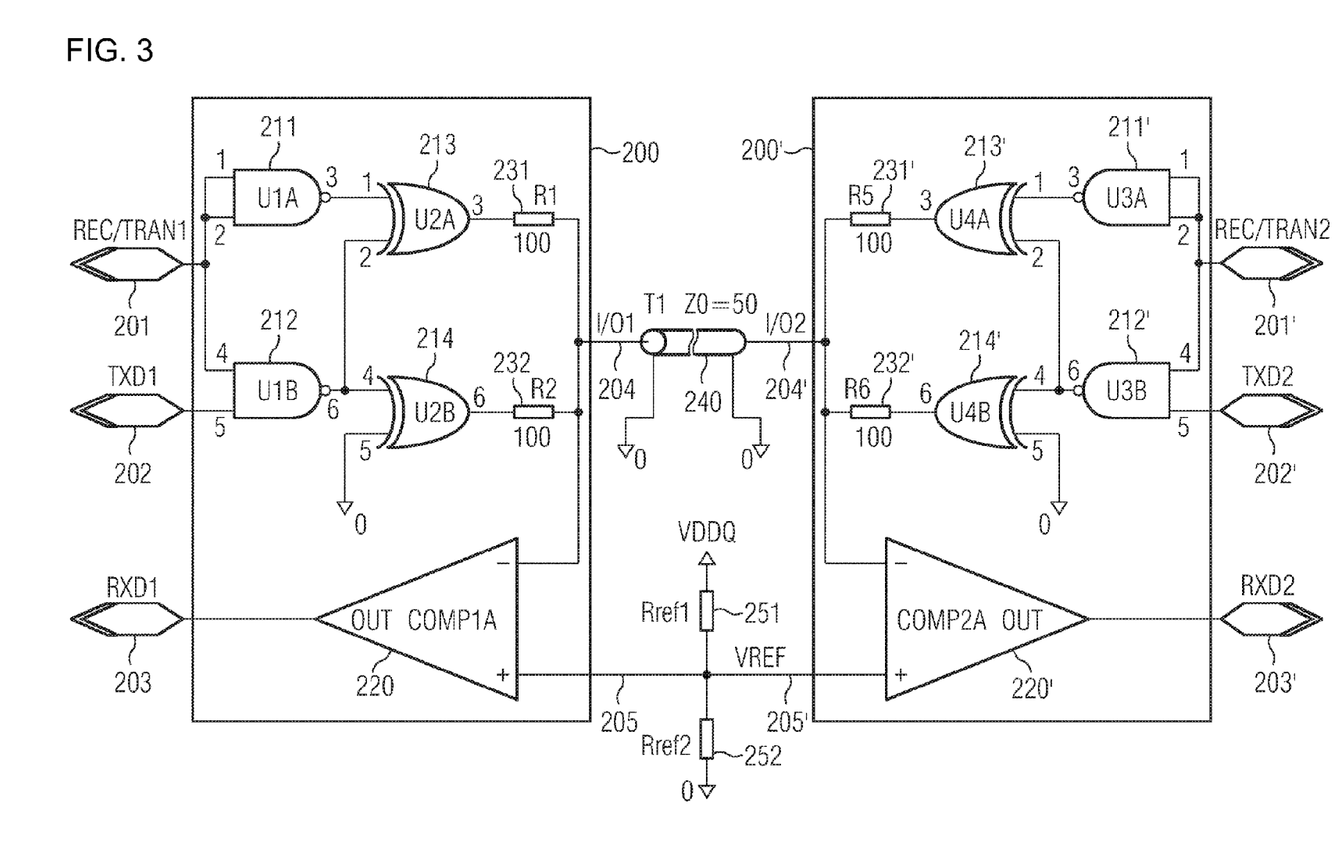
FIG. 3 shows a bidirectional data transmission system containing two transceivers of identical construction as shown in FIG. 2.

FIG. 3 shows a bidirectional data transmission system which consists of two transceivers 200, 200' of identical construction as shown in FIG. 2. A transceiver 200, 200', respectively, is connected to one end of the data transmission line 240. For data transmission from the first transceiver 200 to the second transceiver 200', a HIGH signal is applied to the first connection 201 of the first transceiver 200 in order to switch this transceiver into the transmit mode, and a LOW signal is applied to the first connection 201' of the second transceiver 200' in order to switch this transceiver into the receive mode.

As described above, a signal applied to the second connection 202 of the first transceiver 200, is inverted and output at the I/O connection 204, thereby influencing the level at the I/O connection 204' of the second transceiver accordingly, and evaluated by the comparator 220', whereupon due to the inverting action of the comparator 203', the signal originally applied to the second connection 202 of the first transceiver 200 is output at the third connection 203' of the second transceiver 200'.

Accordingly, for data transmission from the second transceiver 200' to the first transceiver 200, a HIGH signal is applied to the first connection 201' of the second transceiver 200' in order to switch this transceiver into the transmit mode, and a LOW signal is applied to the first connection 201 of the first transceiver 200 in order to switch this transceiver into the receive mode.

It should be pointed out that the transmission line is terminated at both ends at all times.

In the example of FIG. 3, the reference voltage $V_{ref}$ for both transceivers 200, 200' is generated by a voltage divider having identical resistors $R_{ref1}$, $R_{ref2}$ 251, 252. Alternately, the reference voltage for each circuit can be provided separately. Provided that there is no control, for example as part of a microcontroller, by which the direction of the data transmission is controlled, the transceiver circuit as shown in FIG. 2 can be expanded by a circuit which provides state detection (free/busy) of the data transmission line 240. Asynchronous operation of the system illustrated in FIG. 3 is then made possible by means of two such expanded transceiver circuits.

When the circuit of FIG. 3 is in operation, due to the resistance relationships of the data transmission line 240 which is terminated at both ends, HIGH and LOW levels are established which differ from the no-load levels of the isolated transceiver circuit 200, 200' described in conjunction with FIG. 2. HIGH level amounts to 75% of the operating voltage and LOW level is 25% of the operating voltage. As the expert can immediately recognize, it follows that

- in the receive mode, the fourth connection 204' of the receiver 200', as explained above with reference to FIG. 2, is supplied at half the operating voltage,
- the I/O connection 204 of the transmitter 200 is supplied at the full operating voltage or ground potential, respectively, and
- the respective effective resistances (source resistance of the transmitter 200 and the terminating resistance of the receiver 200') have been made essentially identical.

Figure 4:
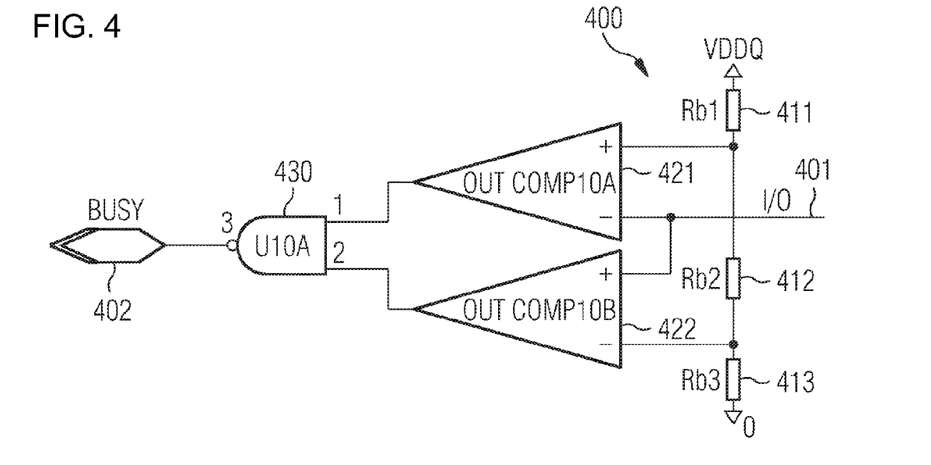
FIG. 4 shows a circuit for detecting the state of the data transmission line.

FIG. 4 shows an exemplary circuit 400 for state detection (free/busy) of the data transmission line. The circuit 400 has a first connection 401 for coupling to the transmission line and a second connection 402 for outputting a Free/Busy signal (BUSY). The signal received via the data transmission line is passed to a window comparator which consists of two comparators 421, 422 and whose upper operating point lies between the minimum permissible voltage value for "HIGH" on the data transmission line and the half value of the operating voltage and whose lower operating point lies between the half value of the operating voltage and the maximum permissible voltage value for "LOW" on the data transmission line. This circuit makes use of the fact that a free line has a level corresponding to the half value of the operating voltage and a busy line either a HIGH or a LOW level in accordance with JEDEC SSTL 2 tables 2a, 2b, 4 and 5.

The dimensioning of the three resistors 411, 412, 413 which as a voltage divider supply the reference voltages for the comparators 421, 422, can be easily achieved using the maximum permissible voltage value for "LOW" and the minimum permissible voltage value for "HIGH".

An example of the dimensioning of the resistors 411, 412, 413 is given below. According to JEDEC SSTL 2 table 2a the following applies:

minimum "HIGH" level=$V_{ref}$+0.18 V=1.43 V maximum "LOW" level=$V_{ref}$−0.18 V=1.07 V In order to take account of the component tolerances of the resistors 411, 412 and 413 plus any offset errors in the comparators 421, 422, it is useful to set the operating thresholds between the reference voltage $V_{ref}$ and the minimum "HIGH" level or the maximum "LOW" level:

upper operating threshold $V_{H,min}=V_{ref}$+0.09 V=1.34 V lower operating threshold $V_{L,max}=V_{ref}$−0.09 V=1.16 V The voltage dividers formed by the resistors 411-413 yield the following relationships:

$V_{H,min}=V_{DDQ}\cdot(Rb2+Rb3)/(Rb1+Rb2+Rb3)$ $V_{L,max}=V_{DDQ}\cdot Rb3/(Rb1+Rb2+Rb3)$ Transformation gives:

$(Rb2+Rb3)\cdot V_{DDQ}/V_{H,min}=Rb1+Rb2+Rb3$ $Rb3\cdot V_{DDQ}/V_{L,max}=Rb1+Rb2+Rb3$ from which:

$(Rb2+Rb3)\cdot V_{DDQ}/V_{H,min}=Rb3\cdot V_{DDQ}/V_{L,max}$ or further simplified:

$Rb2/Rb3=V_{H,min}/V_{L,max}-1$

There are only two conditional equations for the three resistors, one resistance value is therefore optional. Rb3 is now made 10 kΩ. Rb2 therefore gives: Rb2=Rb3·($V_{H,min}/V_{L,max}$−1)=10 kΩ·(1.34/1.16−1)=1.55 kΩ

Entering Rb1 into one of the initial equations gives 10 kΩ.

In the operational state the circuit of FIG. 4 performs as follows: if a voltage at the first connection 401 is above the minimum permissible voltage value for "HIGH" or below the maximum permissible voltage value for "LOW", then either the output of the first comparator 421 or the output of the second comparator 422 goes to LOW level. Correspondingly, the output of a NAND gate 430, with which the outputs of the comparators 421, 422 are combined and which is connected to the second connection 402, goes to a HIGH level, which indicates that the line is busy. On the other hand, if the voltage at the first connection 401 is above the maximum permissible voltage value for "LOW" and below the minimum permissible voltage value for "HIGH", then the outputs of both comparators 421, 422 go to a HIGH level and the output of the NAND gate 430, and with it the second connection 402, go to a LOW level, which indicates that the line is free.

The exemplary embodiments described above relate to a non-differential data transmission line, that is to say a single data transmission line, in which there must be identical operating voltages and ground potentials, both at the transmitter and at the receiver, in order to ensure correct signal evaluation. However, in faulty systems it can happen that the specified potentials at the transmitter and at the receiver deviate from each other, so that signal evaluation is no longer possible because then, for example, the transmitted HIGH/LOW levels no longer coincide with the corresponding detection thresholds at the receiver. This results in transmission errors.

Moreover, an inevitable drawback is that the two transceivers 200, 200' are spatially separated from one another and the data transmitted between these cause a corresponding alternating current in the ground system or voltage supply network. With high data rates, the permanent, unavoidable inductances of these networks then manifest themselves as alternating voltage amplitudes. For example, this can then mean that an alternating voltage amplitude can be measured between the ground connection of the first transceiver 200 and the ground connection of the second transceiver 200'. In complex circuits this effect can lead to considerable impairment in data quality in spite of careful design of the ground system or voltage supply network.

Finally, the need to provide a separate reference voltage can be a disadvantage.

So-called differential data transmission is therefore already used in JEDEC SSTL 2 chapter 5, particularly for circuits with high clock rates. In differential data transmission, data are transmitted simultaneously with opposite levels via two virtually identical transmission lines.

Figure 5:
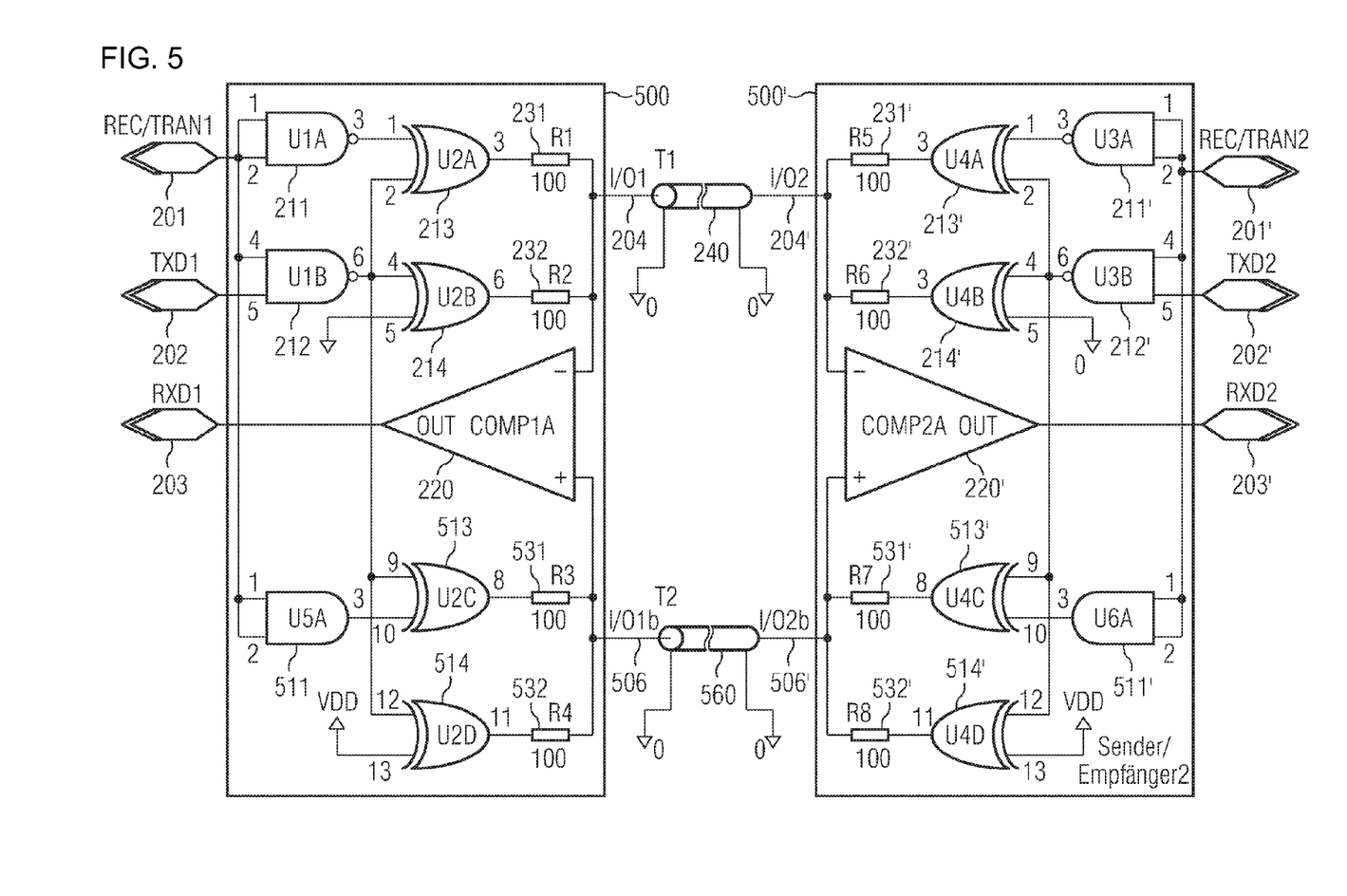
FIG. 5 shows a differential, bidirectional data transmission system containing two differential transceivers of identical construction.

How the inventive circuit can be adapted for differential operation is described below with reference to FIG. 5. In FIG. 5 the reference numbers (201-240) have been taken from FIG. 3 for those circuit parts that are identical to those of FIG. 3 and which fulfill the same function. In order to describe their function and to avoid repetition, reference is made to the description of FIG. 3. Added elements have reference numbers beginning with the numeral 5.

FIG. 5 shows two transceivers 500 and 500' of identical construction. A transceiver 500, 500' for the differential mode has 5 connections 201-204, 506: corresponding to FIGS. 2 and 3 a first connection 201 for injecting a transmit/receive selection signal, a second connection 202 for injecting a data signal to be transmitted, a third connection 203 for outputting a data signal, a fourth connection 204 for coupling the circuit 200 to the first data transmission line 240. Differing from FIGS. 2 and 3, the transceiver 500 needs no reference voltage $V_{ref}$, but has a fifth connection 506 for connecting the second data transmission line 560.

The transceiver 500 consists of two circuit parts, it again being possible for the transmit/receive selection signal at the first connection 201 to signal whether the circuit 500 is operating in the receive mode or in the transmit mode, it being possible in the present exemplary embodiment for a LOW level at the first connection 201 to switch the circuit into the receive mode and a HIGH level to switch the circuit into the transmit mode.

The receive section of the circuit again consists of a comparator 220, whose non-inverting input in this case is connected to the fifth connection 506 and therefore to the second data transmission line 560. The inverting input is unchanged with respect to FIGS. 2, 3 and is connected to the fourth connection 204 and therefore to the first data transmission line 240. The output of the comparator 220 is connected to the connection 203 and consequently delivers the receive signal RXD. If the voltage at the first I/O connection 204 of the circuit 500 corresponds to a HIGH signal, inevitably the voltage at the second I/O connection 506 corresponds simultaneously to a LOW signal, that is to say the voltage at the first I/O connection 204 is higher than the voltage at the second I/O connection 506, so the RXD connection 203 goes to LOW. On the other hand, if the voltage at the first I/O connection 204 of the circuit 500 corresponds to a LOW signal, inevitably the voltage at the second I/O connection 506 corresponds simultaneously to a HIGH signal, that is to say the voltage at the first I/O connection 204 is lower than the voltage at the second I/O connection 506, so the RXD connection 203 goes to HIGH level.

The transmit part of the circuit 500 consists of a first circuit section which is essentially identical to that shown in FIG. 2, including the gates 211-214 as well as the resistors 231, 232 for the connection to the first data transmission line 240 plus a second circuit section containing an AND gate 511, two XOR gates 513, 514 and two resistors 531, 532 for coupling the outputs of the XOR gates 513, 514 to the second data transmission line 560. The second circuit section functions in a complementary way to the first circuit section, that is to say constructed so that a LOW signal is output via the second data transmission line if a HIGH signal is output via the first data transmission line, and vice versa. For the transceiver 500 also, the connection of the I/O connections 204, 506 to the receive comparator 220 is permanent, so that data that are input at the TXD connection 202 and intended to be transmitted via the data transmission lines 240, 560, can be checked at the RXD connection 203.

Receive Mode

In the receive mode a LOW signal appears at the first connection 201. The explanations of FIG. 2 correspondingly apply to the performance of the first circuit section. Furthermore, the LOW-Signal at the REC/TRAN connection 201 appears at both inputs of the AND gate 511, which therefore exhibit no logic function and is intended only to effect a signal delay which corresponds to the signal delay of the signal that is output by the NAND gate 212. The output of the AND gate 511 is therefore a LOW signal which appears at the first input 10 of the third XOR gate 513.

At its second input 9, the third XOR gate 513 receives the signal (HIGH) that is output by the second NAND gate 212 of the first circuit section. In the receive mode, different signals appear at the inputs 9 and 10 of the third XOR gate 513, therefore the output of the XOR gate is a HIGH-Signal. At its first input 12, the fourth XOR gate 514 likewise receives the signal (HIGH) that is output by the second NAND gate 212 of the first circuit section and is permanently connected to the operating voltage via its second input 13. Here the fourth XOR gate 514 functions as an inverter whose output is thus LOW in the receive mode. The advantage of using the XOR gate 514 at this position is again that the signal that is output is subject to the same delays as the signal that is output by the other XOR gates 213, 214, 513, it also being possible in this case for other circuit variations to be immediately obvious to the expert.

In the receive mode, the outputs 8 and 11 of the XOR gates 513, 514 therefore also have different levels, and the explanations given for the I/O connection 204 in conjunction with FIG. 2 apply to the performance of the second I/O connection 506.

Also, the second data transmission line 560, which in the present case has—at least approximately—a purely resistive impedance of 50Ω, is therefore matched to the sink (that is to say at the receiver end).

Transmit Mode

In the transmit mode a HIGH signal appears at the first connection 201. The operation of the first circuit section is again that described above with reference to FIG. 2. The second circuit section receives this HIGH signal at both inputs of the AND gate 511, whose output is therefore a HIGH signal which appears at the first input 10 of the third XOR gate 513.

At their respective inputs 9, 12, both XOR gates 513, 514 of the second circuit section receive the output of the second NAND gate 212, whose inverted output follows the TXD signal at the second connection 202. The fourth XOR gate 514 inverts this signal again, so that the non-inverted TXD signal is output at the output 11 of the fourth XOR gate. The same also applies to the output 8 of the third XOR gate, since in the transmit mode its first input 10 likewise has a constant HIGH signal.

In the transmit mode, like the outputs 3 and 6 of the XOR gates 213, 214, the outputs 8 and 11 of the XOR gates 513, 514 therefore always have identical levels. By means of the resistors R1 and R2 531, a HIGH level is therefore established at the second I/O connection 506, with a HIGH signal at the TXD connection 202 and a LOW level with a LOW signal at the TXD connection 202—exactly the inverse of the performance of the first I/O connection 204. From the point of view of the second data transmission line 560, the source resistance appearing at the I/O connection 506 essentially corresponds to the parallel connection of the two resistors R1, R2 and in the present exemplary embodiment has a value of $R_q$=50Ω. The second data transmission line 560, which in the present case has—at least approximately—a resistive impedance of 50Ω is therefore matched to the source (that is to say at the transmitter end).

Due to termination of the transmission lines 240, 560 at the other end by a terminating resistance $R_a$=50Ω, for example by means of a circuit 500' of identical construction which operates in the receive mode, the voltage value is, by the resulting voltage divider, divided down to permissible values in accordance with JEDEC SSTL 2 tables 4 and 5.

In an advantageous manner the arrangement of FIG. 5 requires neither a terminating voltage nor a reference voltage in order to reliably detect transmitted data, and the alternating voltage deviation on the ground system or voltage supply network is considerably lower than that of the arrangement in FIG. 3. The fact that both transmission lines 240, 560 are always terminated at both ends also applies to the arrangement of FIG. 5. The explanations relating to FIG. 3 correspondingly apply to the HIGH and LOW levels established during operation.

The transceiver circuits 500, 500' in FIG. 5 can also be supplemented by a circuit which delivers state detection (free/ busy) for the transmission lines 240, 560 and enables asynchronous operation of the system illustrated in FIG. 5.

Figure 6:
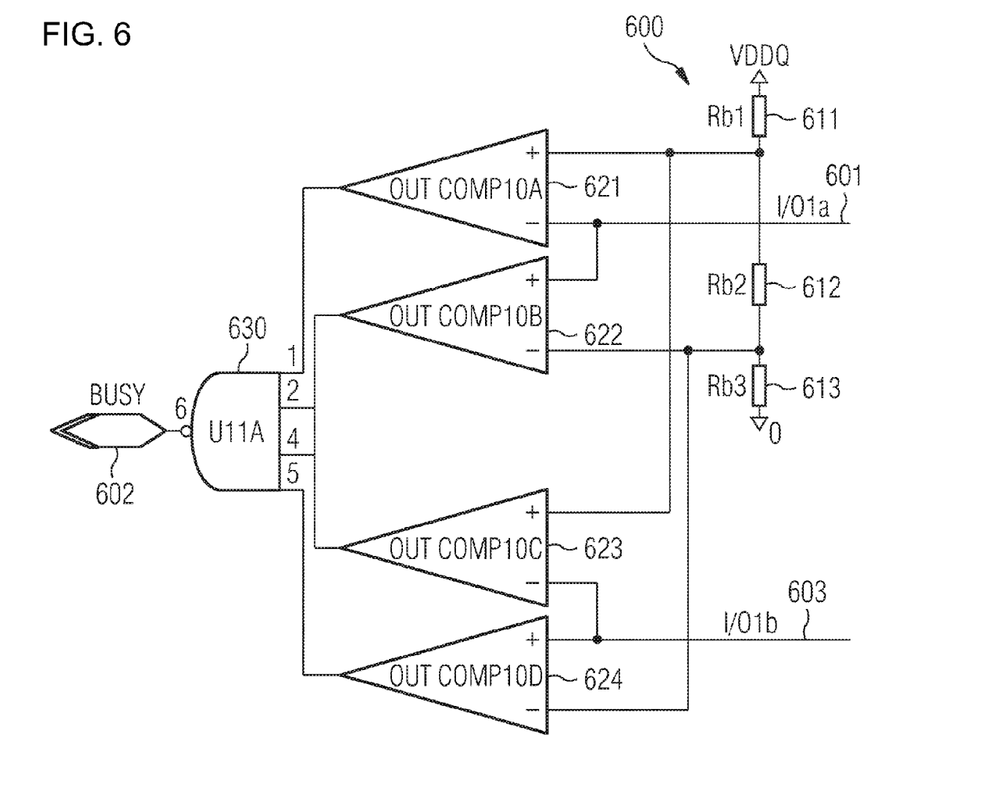
FIG. 6 shows a circuit for detecting the state of the data transmission line for a differential, bidirectional data transmission system.

FIG. 6 shows an exemplary circuit 600 for state detection (free/busy) of the data transmission line, which circuit consists essentially of one circuit 400 as in FIG. 4 for each of the two lines. Circuit 600 has a first connection 601 for coupling to the first data transmission line, a second connection 602 for outputting the free/busy signal (BUSY)) and a third connection 603 for coupling to the second data transmission line. The signal received via the transmission lines is fed to a window comparator which consists of two comparators 621, 622 and 623, 624, respectively, and whose upper operating points lie between the minimum permissible voltage value for "HIGH" on the transmission lines and half the operating voltage value, and whose lower operating points lie between half the operating voltage value and the maximum permissible voltage value for "LOW" on the transmission lines. Again, the dimensioning of the three resistors 611, 612, 613, which as a voltage divider deliver the reference voltages for the comparators 621, 622 and the comparators 623, 624, can be easily achieved by using the maximum permissible voltage values for "LOW" and the minimum permissible voltage values for "HIGH".

The performance of the circuit corresponds to that of circuit 400 described with reference to FIG. 4, with the difference that the outputs of all four comparators 621-624 are combined with a quad NAND gate 630 for the BUSY output signal. Of course, instead of the quad NAND gate, the expert has available numerous circuit variants with equivalent logic function, which are constructed from a plurality of conventional gates, each having only two inputs.

The inventive bidirectional data transmission systems as shown in FIGS. 3 and 5 can be easily expanded to bus systems.

Figure 7:
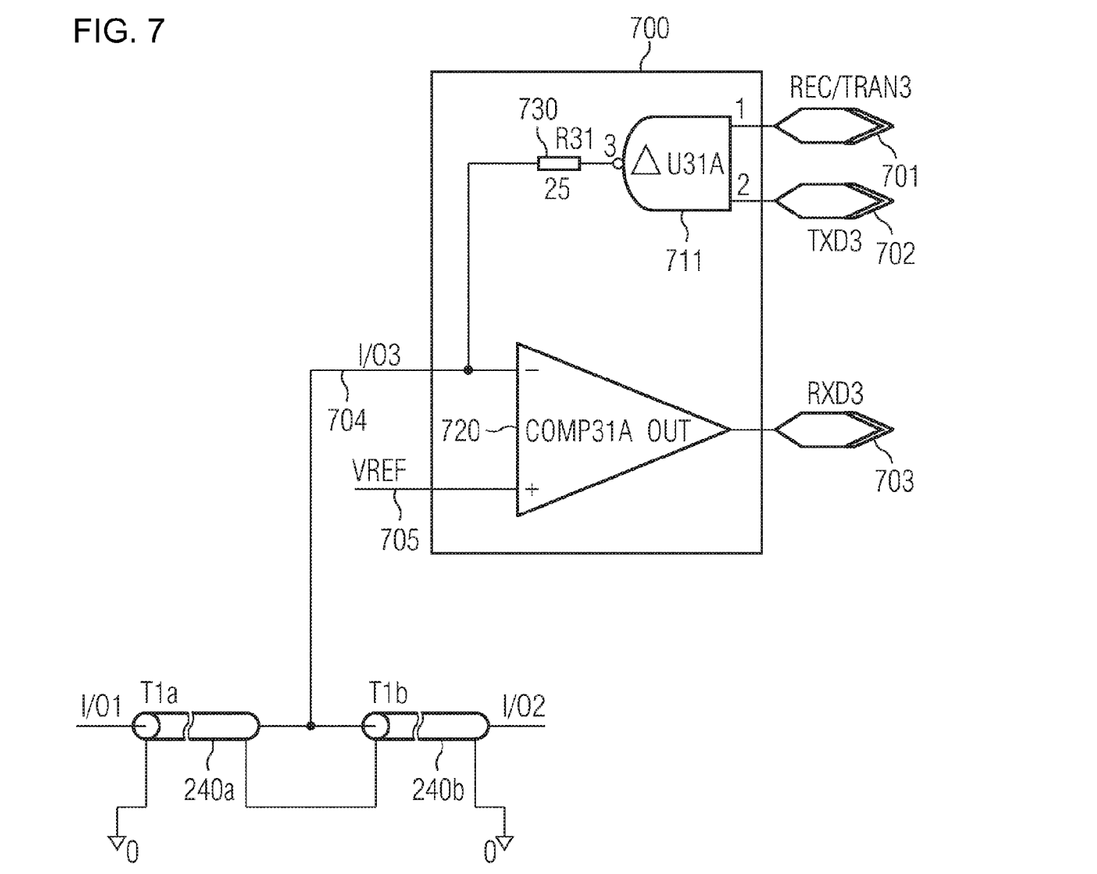
FIG. 7 shows a circuit for connecting additional sources or sinks to a data transmission system as shown in FIG. 3.

In order to connect further data sources/sinks to the data transmission line, an exemplary transceiver 700 illustrated in FIG. 7 can be used for a non-differential data transmission system as shown in FIG. 3. The transceiver 700 again has a first connection 701 for injecting the transmit/receive selection signal, a second connection 702 for injecting a data signal to be transmitted, a third connection 703 for outputting a data signal, a fourth connection 704 for coupling the circuit 700 to the (single) data transmission line 240, and a fifth connection 705 for supplying the reference voltage $V_{ref}$.

The point where the circuit 700 is inserted into the data transmission system is along the data transmission line 240. The data signal must therefore be transmitted in both line sections. The effective resistance is therefore composed of the parallel connection of two line sections, each having the line resistance (in this case: 50Ω) and therefore corresponds to half the line resistance (in this case: 25Ω). The source resistance should be made equal to half the line resistance to achieve the best possible matching.

FIG. 7 shows the data transmission line 240 of FIG. 3, divided into two parts 240*a* and 240*b*, to which is coupled the I/O connection 704 of the circuit 700, which is internally coupled to the inverting input of a comparator 720, since the TXD signals in the system of FIG. 3 are transmitted inverted on the data transmission line 240. The non-inverting input of the comparator 720 is coupled to the reference voltage. The configuration of the comparator 720 is therefore identical to the configuration of the comparator 220 of FIG. 2, so that the description of its function is identical to that given there.

The transmit section of the circuit 700 is provided with an inverting tristate driver 711 which is connected to the I/O connection 704 via a resistor 730, whose dimensioning was explained above, and which driver is controlled via the signal appearing at the REC/TRAN connection 701 either with high resistance (where REC/TRAN=LOW, that is to say when the circuit is in the receive mode) or outputs the inverted signal appearing at the TXD connection 702 (where REC/TRAN=HIGH, that is to say when the circuit is in the transmit mode). A suitable driver for use in this circuit is the 74HC240 chip, for example.

Figure 8:
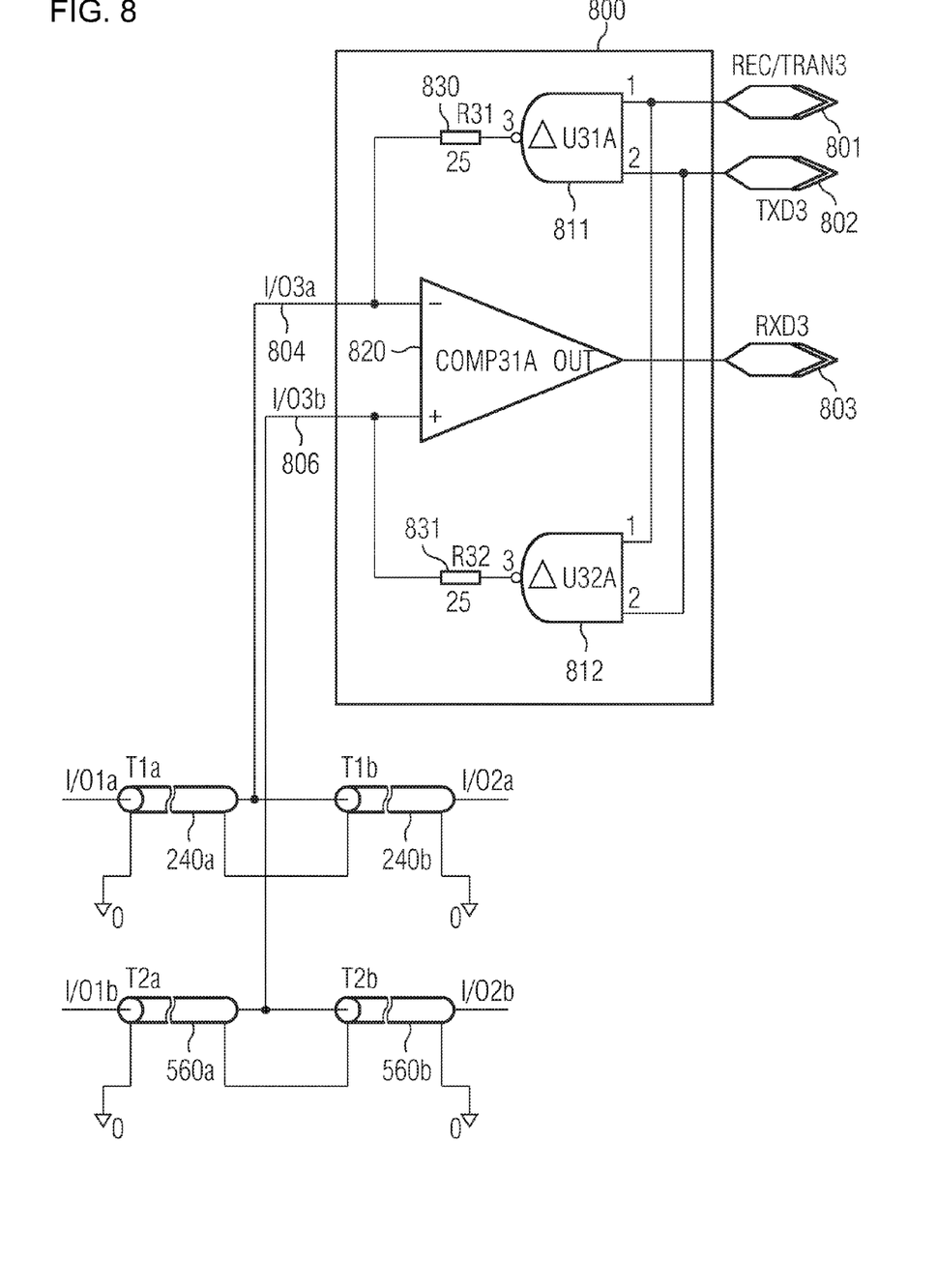
FIG. 8 shows a circuit for connecting additional sources or sinks to a data transmission system as shown in FIG. 5.

An exemplary transceiver 800 illustrated in FIG. 8 can be used for a differential data transmission system shown in FIG. 5, to connect additional data sources/sinks to the data transmission line. The transceiver 800 again has a first connection 801 for injecting the transmit/receive selection signal, a second connection 802 for injecting a data signal to be transmitted, a third connection 803 for outputting a data signal, a fourth connection 804 for coupling the circuit 800 to the first data transmission line 240 and a fifth connection 806 for coupling the circuit 800 to the second data transmission line 560.

The corresponding explanations in FIG. 7 apply to the insertion point of the circuit 800 in the transmission lines and the dimensioning of the source resistors.

FIG. 7 shows the first data transmission line 240 of FIG. 5, divided into two parts 240*a* and 240*b*. Coupled to this is the first I/O connection 804 of the circuit 800, which is coupled internally to the inverting input of the comparator 820, since the TXD signals are transmitted inverted on the first data transmission line 240 in the system of FIG. 5. The non-inverting input of the comparator 820 is coupled via the second I/O connection 806 to the second data transmission line 560, via which the TXD signals are transmitted without inversion. The configuration of the comparator 820 is therefore identical to the configuration of the comparator 220 of FIG. 5, so that the description of its function is identical to that given there.

The transmit section of the circuit 800 is provided with an inverting tristate driver 811 which is connected to the I/O connection 804 via a resistor 830, and the signal appearing at the TXD connection 802 is output inverted via the first data transmission line 240 (where REC/TRAN=HIGH, that is to say when the circuit is in the transmit mode). A second, non-inverting tristate driver 812 is provided, which is connected via a resistor 831 to the second I/O connection 806 and the signal appearing at the TXD connection 802 is output without inversion via the second data transmission line 560 (where REC/TRAN=HIGH, that is to say when the circuit is in the transmit mode). If the circuit is in the receive mode (REC/TRAN=LOW), then the outputs of the drivers 811, 812 are controlled at high resistance.

Of course a plurality of transceivers as shown in FIG. 7 or FIG. 8 can be incorporated into a data transmission system as shown in FIG. 3 or FIG. 5.

It is possible with the circuit arrangements described above to set up digital transmission links to suit the application. An appropriate multi-repetition bidirectional transmission system as shown in FIG. 3 or FIG. 5 can be advantageously used to optimize the connections between a microprocessor and an external memory to the effect that addresses and data are transmitted on the same lines. This considerably reduces the overall number of lines that are required. At the same time, the differential embodiment shown in FIG. 5 permits data transmission rates that are only limited by the logic employed and the HF characteristics of the transmission lines or their carriers.

This invention claimed is:

1. A transceiver circuit, comprising:
   a first connection for injecting a transmit/receive selection signal;
   a second connection for injecting a data signal to be transmitted;
   a third connection for outputting a further data signal;
   a fourth connection for a data transmission line;
   a circuit configuration, which in response to a receive signal at said first connection, makes available at said fourth connection a voltage corresponding approximately to half an operating voltage, wherein an effective terminating resistance at said fourth connection corresponds approximately to a resistance of the data transmission line for achieving line matching at a receiver end and a signal received via the data transmission line is evaluated and output at said third connection; and
   said circuit configuration in response to a transmit signal at said first connection, makes available at said fourth connection a further voltage corresponding approximately to the operating voltage, if a LOW signal is injected at said second connection and at said fourth connection makes available an additional voltage corresponding approximately to a ground potential if a HIGH signal is injected at said second connection, wherein in both cases an effective source resistance corresponds approximately to the resistance of the data transmission line for achieving line matching at a transmitter end;
   said circuit configuration including a first resistor and a second resistor, wherein at least said first resistor and said second resistor form said effective terminating resistance at said fourth connection in response to said receive signal at said first connection, and at least said first resistor and said second resistor form said effective source resistance at said fourth connection in response to said transmit signal at said first connection.

2. The transceiver circuit according to claim 1, wherein said circuit configuration includes:
   a first logic circuit connected to said first connection and inverting the transmit/receive selection signal;
   a second logic circuit connected to said first and second connections for NAND combination of the transmit/receive selection signal with the data signal to be transmitted;
   a third logic circuit connected to said first and second logic circuits for XOR combination of an output signal of said first logic circuit with an output signal of said second logic circuit;
   a fourth logic circuit connected to said second logic circuit for relaying the output of said second logic circuit;
   a comparator circuit connected to said fourth connection for comparing a signal appearing at said fourth connection with a reference voltage and outputting a HIGH level at said third connection if the signal appearing at said fourth connection represents a "LOW" value and outputs a LOW level at said third connection if the signal appearing at said fourth connection represents a "HIGH" value;
   said first resistor connecting an output of said third logic circuit to said fourth connection; and
   said second resistor connecting an output of said fourth logic circuit to said fourth connection.

3. The transceiver circuit according to claim 2, wherein said first and second resistors have resistance values being approximately equal.

4. The transceiver circuit according to claim 3, wherein said resistance values of said first and second resistors correspond approximately to double a resistance value of the data transmission line.

5. The transceiver circuit according to claim 1, further comprising a fifth connection for injecting a reference voltage.

6. The transceiver circuit according to claim 1, further comprising:
   a sixth connection; and
   an additional circuit configuration for detecting whether a state of the data transmission line is one of "busy" and "free" and which outputs the state via said sixth connection.

7. The transceiver circuit according to claim 6, wherein said additional circuit configuration for detecting whether the state of the data transmission line is one of "busy" and "free", has a window comparator whose upper operating point lies between a minimum permissible voltage value for "HIGH" on the data transmission line and half the operating voltage, and whose lower operating point lies between half the operating voltage and a maximum permissible voltage value for "LOW" on the data transmission line.

8. The transceiver circuit according to claim 1, wherein: said circuit configuration includes a first logic gate that has an output, and a second logic gate that has an output, said first resistor has a first end connected to said first logic gate and a second end connected to said fourth connection during transmission and reception, and said second resistor has a first end connected to said second logic gate and a second end connected to said fourth connection during transmission and reception.

9. A transceiver circuit, comprising:
   a first connection for injecting a transmit/receive selection signal;
   a second connection for injecting a data signal to be transmitted;
   a third connection for outputting a further data signal;
   a fourth connection for a data transmission line; and
   a circuit configuration, which in response to a receive signal at said first connection, places said fourth connection in a high-resistance state and evaluates a signal received via the data transmission line and outputs it at said third connection; and
   said circuit configuration in response to a transmit signal at said first connection, makes available at said fourth connection a voltage corresponding approximately to an operating voltage if a LOW signal is injected at said second connection and makes available at said fourth connection a further voltage which corresponds approximately to a ground potential if a HIGH signal is injected at said second connection, wherein in both cases a value of an effective source resistance corresponds approximately to half a resistance value of the data transmission line for achieving line matching at a transmitter end.

10. The transceiver circuit according to claim 9, wherein said circuit configuration includes:
    an inverting driver circuit having a tristate output for outputting an inverted output of the data signal to be transmitted under tristate control of the transmit/receive selection signal, said inverting driver circuit connected to said first connection;
    a comparator circuit comparing a signal appearing at said fourth connection with a reference voltage and outputs a HIGH level at said third connection if the signal appearing at said fourth connection represents a "LOW" value and outputs a LOW level at said third connection if the signal appearing at said fourth connection represents a "HIGH" value; and
a resistor connected between said tristate output of said inverting driver circuit and said fourth connection.

11. The transceiver circuit according to claim 10, wherein said resistor has a value corresponding approximately to half the resistance value of the data transmission line.

12. The transceiver circuit according to claim 9, further comprising a fifth connection for injecting a reference voltage.

13. The transceiver circuit according to claim 9, further comprising:
a sixth connection; and
an additional circuit configuration for detecting whether a state of the data transmission line is one of "busy" and "free" and outputting the state via said sixth connection.

14. The transceiver circuit according to claim 13, wherein said additional circuit configuration for detecting whether the state of the data transmission line is one of "busy" and "free", has a window comparator whose upper operating point lies between a minimum permissible voltage value for "HIGH" on the data transmission line and half the operating voltage, and whose lower operating point lies between half the operating voltage and a maximum permissible voltage value for "LOW" on the data transmission line.

15. A data transmission system, comprising:
a data transmission line; and
two transceiver circuits, each of said transceiver circuits containing:
a first connection for injecting a transmit/receive selection signal;
a second connection for injecting a data signal to be transmitted;
a third connection for outputting a further data signal;
a fourth connection connected to said data transmission line;
a circuit configuration which in response to a receive signal at said first connection, makes available at said fourth connection a voltage corresponding approximately to half an operating voltage, wherein an effective terminating resistance at said fourth connection corresponds approximately to a resistance of said data transmission line for achieving line matching at a receiver end and a signal received via said data transmission line is evaluated and output at said third connection; and
said circuit configuration in response to a transmit signal at said first connection, makes available at said fourth connection a further voltage corresponding approximately to the operating voltage, if a LOW signal is injected at said second connection and at said fourth connection said circuit configuration makes available a additional voltage corresponding approximately to a ground potential if a HIGH signal is injected at said second connection, wherein in both cases an effective source resistance corresponds approximately to a resistance of said data transmission line for achieving line matching at a transmitter end;
said circuit configuration including a first resistor and a second resistor, wherein at least said first resistor and said second resistor form said effective terminating resistance at said fourth connection in response to said receive signal at said first connection, and at least said first resistor and said second resistor form said effective source resistance at said fourth connection in response to said transmit signal at said first connection.

16. The data transmission system according to claim 15, further comprising at least one further transceiver circuit containing:
a further first connection for injecting the transmit/receive selection signal;
a further second connection for injecting the data signal to be transmitted;
a further third connection for outputting the further data signal;
a further fourth connection connected to said data transmission line;
a further circuit configuration, which in response to a receive signal at said further first connection, places said further fourth connection in a high-resistance state and evaluates a signal received via said data transmission line and outputs it at said further third connection; and
said further circuit configuration in response to a transmit signal at said further first connection, makes available at said further fourth connection the further voltage corresponding approximately to the operating voltage if the LOW signal is injected at said further second connection and makes available at said further fourth connection the additional voltage corresponding approximately to the ground potential if the HIGH signal is injected at said further second connection, wherein in both cases the value of the effective source resistance corresponds approximately to half the resistance value of said data transmission line for achieving line matching at the transmitter end.

17. A transceiver circuit, comprising:
a first connection for injecting a transmit/receive selection signal;
a second connection for injecting a data signal to be transmitted;
a third connection for outputting a further data signal;
a fourth connection for a first data transmission line;
a fifth connection for a second data transmission line;
a circuit configuration, which in response to a receive signal at said first connection makes available at said fourth connection and at said fifth connection a voltage which corresponds approximately to half an operating voltage, wherein an effective terminating resistance at said fourth connection corresponds approximately to a resistance of the first data transmission line to achieve line matching at a receiver end, and wherein an effective terminating resistance at said fifth connection corresponds approximately to a resistance of the second data transmission line to achieve line matching at the receiver end, and the signals received via the first and second transmission lines are evaluated and output as a received data signal at said third connection;
said circuit configuration in response to a transmit signal at said first connection makes available at said fourth connection a voltage corresponding approximately to the operating voltage and makes available at said fifth connection a voltage corresponding approximately to a ground potential if a LOW signal is injected at said second connection, and makes available at said fourth connection a voltage corresponding approximately to the ground potential, and makes available at said fifth connection a voltage corresponding approximately to the operating voltage, if a HIGH signal is injected at said second connection, wherein in each case effective source resistances correspond approximately to a resistance of a corresponding one of the first and second data transmission lines to achieve line matching at a transmitter end;

said circuit configuration including a first resistor and a second resistor, wherein at least said first resistor and said second resistor form said effective terminating resistance at said fourth connection in response to said receive signal at said first connection, and at least said first resistor and said second resistor form said effective source resistance at said fourth connection in response to said transmit signal at said first connection; and said circuit configuration including a third resistor and a fourth resistor, wherein at least said third resistor and said fourth resistor form said effective terminating resistance at said fifth connection in response to said receive signal at said first connection, and at least said third resistor and said fourth resistor form said effective source resistance at said fifth connection in response to said transmit signal at said first connection.

18. The transceiver circuit according to claim 17, wherein said circuit configuration includes:

a first logic circuit for inverting the transmit/receive selection signals and connected to said first connection;

a second logic circuit for NAND combination of the transmit/receive selection signal with the data signal to be transmitted and connected to said first and second connections;

a third logic circuit for XOR combination of an output of said first logic circuit with an output of said second logic circuit;

a fourth logic circuit for relaying the output of said second logic circuit;

a fifth logic circuit for relaying the transmit/receive selection signal;

a sixth logic circuit for XOR combination of an output of said fifth logic circuit with the output of said second logic circuit;

a seventh logic circuit for inverting the output of said second logic circuit;

a comparator circuit for comparing a signal appearing at said fourth connection with a signal appearing at said fifth connection and outputs a LOW level at said third connection if the signal appearing at said fourth connection represents a "HIGH" value and the signal appearing at said fifth connection represents a "LOW" value, and outputs a HIGH level at said third connection if the signal appearing at said fourth connection represents the "LOW" value and the signal appearing at said fifth connection represents the "HIGH" value;

said first resistor connecting an output of said third logic circuit to said fourth connection;

said second resistor connecting an output of said fourth logic circuit to said fourth connection;

said third resistor connecting an output of said sixth logic circuit to said fifth connection; and said fourth resistor connecting an output of said seventh logic circuit to said fifth connection.

19. The transceiver circuit according to claim 18, wherein said first, second, third and fourth resistors have resistance values which are approximately equal.

20. The transceiver circuit according to claim 19, wherein said resistance values correspond approximately to double a resistance value of the first and second transmission lines.

21. The transceiver circuit according to claim 17, further comprising:

a sixth connection; and an additional circuit configuration for detecting whether a state of the first and second transmission lines is one of "busy" and "free" and outputs the state via said sixth connection.

22. The transceiver circuit according to claim 21, wherein said additional circuit configuration for detecting whether the state of the transmission lines is one of "busy" and "free", has a window comparator for each of the first and second transmission lines, whose upper operating point lies between a minimum permissible voltage value for "HIGH" on the first and second transmission lines and half the operating voltage, and whose lower operating point lies between half the operating voltage and a maximum permissible voltage value for "LOW" on the first and second transmission lines.

23. A transceiver circuit, comprising:

a first connection for injecting a transmit/receive selection signal;

a second connection for injecting a data signal to be transmitted;

a third connection for outputting a further data signal;

a fourth connection for a first data transmission line;

a fifth connection for a second data transmission line;

a circuit configuration, which in response to a receive signal at the first connection, places in each case said fourth and fifth connections in a high-resistance state and evaluates signals received via the first and second transmission lines and outputs them as a received data signal at said third connection; and said circuit configuration in response to a transmit signal at said first connection makes available at said fourth connection a voltage corresponding approximately to the operating voltage, and makes available at said fifth connection a voltage corresponding approximately to a ground potential if a LOW signal is injected at said second connection, and makes available at said fourth connection a voltage corresponding approximately to the ground potential, and makes available at said fifth connection a voltage corresponding approximately to the operating voltage if a HIGH signal is injected at said second connection, wherein in each case value of effective source resistances corresponds approximately to half a value of a resistance of the corresponding data transmission line to achieve line matching at a transmitter end.

24. The transceiver circuit according to claim 23, wherein said circuit configuration includes:

an inverting driver circuit having a tristate output for outputting an inverted output of the data signal to be transmitted under tristate control of the transmit/receive selection signals;

a non-inverting driver circuit having a tristate output for outputting an inverted output of the data signal to be transmitted under tristate control of the transmit/receive selection signal;

a comparator circuit comparing a signal appearing at said fourth connection with a signal appearing at said fifth connection and outputs a LOW level at said fourth connection which represents a "LOW" value and the signal appearing at said fifth connection represents a "HIGH" value;

a first resistor connecting said tristate output of said inverting driver circuit to said fourth connection; and a second resistor connecting said tristate output of said non-inverting driver circuit to said fifth connection.

25. The transceiver circuit according to claim 24, wherein said first and second resistors have values corresponding approximately to half the resistance value of the first and second transmission lines.

26. The transceiver circuit according to claim 23, further comprising:
- a sixth connection; and
- an additional circuit configuration for detecting whether a state of the first and second transmission lines is one of "busy" and "free" and outputs the state via said sixth connection.

27. The transceiver circuit according to claim 26, wherein said additional circuit configuration for detecting whether the state of the first and second transmission lines is one of "busy" and "free", have for each of the first and second transmission lines a window comparator, whose upper operating point lies between a minimum permissible voltage value for "HIGH" on the first and second transmission lines and half the operating voltage, and whose lower operating point lies between half the operating voltage and a maximum permissible voltage value for "LOW" on the first and second transmission lines.

28. A data transmission system, comprising:
- first and second transmission lines; and
- two transceiver circuits each containing:
  - a first connection for injecting a transmit/receive selection signal;
  - a second connection for injecting a data signal to be transmitted;
  - a third connection for outputting a further data signal;
  - a fourth connection connected to said first data transmission line;
  - a fifth connection connected to said second data transmission line;
  - a circuit configuration, which in response to a receive signal at said first connection makes available at said fourth connection and at said fifth connection a voltage corresponding approximately to half an operating voltage, wherein an effective terminating resistance at said fourth connection corresponds approximately to a resistance of said first data transmission line to achieve line matching at a receiver end, and wherein an effective terminating resistance at said fifth connection corresponds approximately to a resistance of said second data transmission line to achieve line matching at the receiver end, and signals received via said first and second transmission lines are evaluated and output as a received data signal at said third connection; and
  - said circuit configuration in response to a transmit signal at said first connection makes available at said fourth connection a voltage corresponding approximately to the operating voltage and makes available at said fifth connection a voltage corresponding approximately to a ground potential if a LOW signal is injected at said second connection, and makes available at said fourth connection a voltage corresponding approximately to the ground potential, and makes available at said fifth connection a voltage corresponding approximately to the operating voltage, if a HIGH signal is injected at said second connection, wherein in each case effective source resistances correspond approximately to a resistance of a corresponding one of said first and second data transmission lines to achieve line matching at a transmitter end;
  - said circuit configuration including a first resistor and a second resistor, wherein at least said first resistor and said second resistor form said effective terminating resistance at said fourth connection in response to said receive signal at said first connection, and at least said first resistor and said second resistor form said effective source resistance at said fourth connection in response to said transmit signal at said first connection; and
  - said circuit configuration including a third resistor and a fourth resistor, wherein at least said third resistor and said fourth resistor form said effective terminating resistance at said fifth connection in response to said receive signal at said first connection, and at least said third resistor and said fourth resistor form said effective source resistance at said fifth connection in response to said transmit signal at said first connection.

29. The data transmission system according to claim 28, further comprising at least one further transceiver circuit containing:
- a further first connection for injecting the transmit/receive selection signal;
- a further second connection for injecting the data signal to be transmitted;
- a further third connection for outputting the data signal;
- a further fourth connection connected to said first data transmission line;
- a further fifth connection connected to said second data transmission line;
- a further circuit configuration, which in response to the receive signal at said first connection places in each case said further fourth and further fifth connections in a high-resistance state and evaluates the signals received via said first and second transmission lines and outputs them as a received data signal at said further third connection; and
- said further circuit configuration in response to the transmit signal at said further first connection makes available at said further fourth connection a voltage corresponding approximately to the operating voltage, and makes available at said further fifth connection a voltage corresponding approximately to a ground potential if a LOW signal is injected at said further second connection, and makes available at said further fourth connection a voltage corresponding approximately to the ground potential, and makes available at said further fifth connection a voltage corresponding approximately to the operating voltage if a HIGH signal is injected at said further second connection, wherein in each case a value of effective source resistances corresponds approximately to half a value of the resistance of a corresponding one of said first and second data transmission lines to achieve line matching at a transmitter end.

* * * * *